United States Patent
Furuichi et al.

(10) Patent No.: US 12,467,588 B2
(45) Date of Patent: Nov. 11, 2025

(54) HYDROGEN SUPPLY SYSTEM, HYDROGEN-CONSUMING PLANT PROVIDED WITH HYDROGEN SUPPLY SYSTEM, AND METHOD FOR SUPPLYING HYDROGEN TO HYDROGEN-CONSUMING UNIT

(71) Applicant: MITSUBISHI HEAVY INDUSTRIES, LTD., Tokyo (JP)

(72) Inventors: Hiroyuki Furuichi, Kanagawa (JP); Satoshi Yamamoto, Kanagawa (JP); So Komada, Kanagawa (JP); Tadashi Katsume, Kanagawa (JP); Kaori Yoshida, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/579,021

(22) PCT Filed: Sep. 13, 2022

(86) PCT No.: PCT/JP2022/034139
§ 371 (c)(1),
(2) Date: Jan. 12, 2024

(87) PCT Pub. No.: WO2023/042810
PCT Pub. Date: Mar. 23, 2023

(65) Prior Publication Data
US 2024/0337354 A1 Oct. 10, 2024

(30) Foreign Application Priority Data
Sep. 16, 2021 (JP) .................. 2021-151135

(51) Int. Cl.
*F17C 5/06* (2006.01)

(52) U.S. Cl.
CPC .......... *F17C 5/06* (2013.01); *F17C 2221/012* (2013.01); *F17C 2223/0123* (2013.01); *F17C 2250/043* (2013.01); *F17C 2265/066* (2013.01)

(58) Field of Classification Search
CPC ................. F17C 5/06; F17C 2221/012; F17C 2223/0123; F17C 2250/043;
(Continued)

(56) References Cited

U.S. PATENT DOCUMENTS 5,243,821 A * 9/1993 Schuck ...................... F17C 7/04
62/50.1
7,519,453 B2 * 4/2009 Fairlie ................. H01M 8/0438
700/20
(Continued)

FOREIGN PATENT DOCUMENTS

CN 104126029 A 10/2014
JP 2003049610 A 2/2003
(Continued)

OTHER PUBLICATIONS

JP-2019090452-A English Translation of Specification (Year: 2024).*
(Continued)

*Primary Examiner* — Kenneth Rinehart
*Assistant Examiner* — Stephanie A Shrieves
(74) *Attorney, Agent, or Firm* — Osha Bergman Watanabe & Burton LLP (57) ABSTRACT

A hydrogen supply system includes: a hydrogen production device; a hydrogen flow line through which hydrogen produced by the hydrogen production devices circulated; a buffer tank that is provided in the hydrogen flow line on the downstream side of the hydrogen production device; a compressor that is provided in the hydrogen flow line on a downstream side of the buffer tank; a bypass line that bypasses a portion of the hydrogen flow line and has a
(Continued)

downstream-side end portion communicating with the hydrogen flow line on the downstream side of the buffer tank; and a storage tank that is provided in the bypass line and is capable of storing the hydrogen.

11 Claims, 2 Drawing Sheets

(58) Field of Classification Search
CPC ........ F17C 2265/066; F02C 3/22; C01B 3/00; C01B 3/38
USPC .......................................................... 141/18
See application file for complete search history.

(56) References Cited

U.S. PATENT DOCUMENTS

| | | | |
|---|---|---|---|
| 2004/0255778 A1* | 12/2004 | Reddy | B01D 53/047 96/121 |
| 2005/0181244 A1* | 8/2005 | Porter | H01M 16/003 429/513 |
| 2012/0018033 A1 | 1/2012 | Nakazawa et al. | |
| 2012/0100062 A1 | 4/2012 | Nakamura et al. | |
| 2015/0219279 A1* | 8/2015 | Pelger | F17C 5/06 141/4 |
| 2017/0291486 A1* | 10/2017 | Tanaka | H01M 8/04776 |
| 2023/0204159 A1* | 6/2023 | Werlen | F17C 13/025 141/5 |

FOREIGN PATENT DOCUMENTS

| | | | |
|---|---|---|---|
| JP | 2004-051049 A | | 2/2004 |
| JP | 2004360728 A | * | 12/2004 |
| JP | 2006077698 A | | 3/2006 |
| JP | 2010-208913 A | | 9/2010 |
| JP | 2012026463 A | | 2/2012 |
| JP | 2015-038039 A | | 2/2015 |
| JP | 2018076214 A | | 5/2018 |
| JP | 2019090452 A | * | 6/2019 |
| JP | 2021-004627 A | | 1/2021 |
| WO | 2013083445 A1 | | 6/2013 |

OTHER PUBLICATIONS

International Search Report issued in counterpart International Application No. PCT/JP2022/034139, dated Nov. 8, 2022 (10 pages).

Office Action issued in counterpart Taiwanese Application No. 111135148, dated Aug. 15, 2023 (7 pages).

International Preliminary Report on Patentability issued in counterpart International Application No. PCT/JP2022/034139, dated Mar. 28, 2024 (14 pages).

Office Action Issued in Corresponding JP Application No. 2021-151135, dated Aug. 27, 2024. (9 Pages with English Translation).

* cited by examiner

HYDROGEN SUPPLY SYSTEM, HYDROGEN-CONSUMING PLANT PROVIDED WITH HYDROGEN SUPPLY SYSTEM, AND METHOD FOR SUPPLYING HYDROGEN TO HYDROGEN-CONSUMING UNIT

TECHNICAL FIELD

The present disclosure relates to a hydrogen supply system, a hydrogen-consuming plant including a hydrogen supply system, and a method for supplying hydrogen to a hydrogen-consuming unit.

The present application claims priority based on Japanese Patent Application No. 2021-151135 filed in the Japan Patent Office on Sep. 16, 2021, the contents of which are incorporated herein by reference.

BACKGROUND ART

PTL 1 discloses a gas turbine that can supply a combustor with natural gas and hydrogen obtained by reforming the natural gas as a fuel. During a normal operation of the gas turbine, natural gas, hydrogen, and off-gas are supplied as the fuel to the combustor. During a low-load operation of the gas turbine, such as when a demand for electric power is low, hydrogen is stored without being supplied to the combustor.

In general, a power generation facility using a gas turbine or the like is required to flexibly follow an operating load according to a demand for electric power which fluctuates from moment to moment. Therefore, a facility for supplying a fuel to the gas turbine is also required to quickly follow a fluctuation in the load of the gas turbine and to supply the fuel. However, in a case where hydrogen produced by a chemical process, such as a reforming reaction, is utilized as a fuel for the gas turbine, the chemical process generally has a complicated process in which reaction, separation, heat recovery, and the like are organically combined. Therefore, when operating conditions of a hydrogen production device are changed suddenly, the balance of the entire system is disrupted, which makes it impossible to continue a stable operation. Therefore, it is difficult to make the amount of hydrogen supplied follow a fluctuation in the load of the gas turbine with good response.

CITATION LIST

Patent Literature

[PTL 1] Japanese Unexamined Patent Application Publication No. 2003-49610

SUMMARY OF INVENTION

Technical Problem

PTL 1 discloses that hydrogen is stored during the low-load operation of the gas turbine, but does not disclose a specific configuration of a hydrogen storage facility. Further, PTL 1 discloses that the stored hydrogen is used as an industrial hydrogen product for another purpose or is used as a portion of a fuel for a fuel cell provided separately from the gas turbine. However, it is not assumed that the hydrogen is reused in the gas turbine. Even in the configuration in which the stored hydrogen is reused in the gas turbine, it is difficult to make the amount of hydrogen supplied follow a fluctuation in the amount of fuel supplied when the load of the gas turbine fluctuates only by simply providing a tank for storing the hydrogen.

In view of the above circumstances, an object of at least one embodiment of the present disclosure is to provide a hydrogen supply system, a hydrogen-consuming plant including a hydrogen supply system, and a method for supplying hydrogen to a hydrogen-consuming unit that have improved followability to a fluctuation in demand for hydrogen.

Solution to Problem

In order to achieve the above object, according to the present disclosure, there is provided a hydrogen supply system including: a hydrogen production device; a hydrogen flow line through which hydrogen produced by the hydrogen production device is circulated; a buffer tank that is provided in the hydrogen flow line on a downstream side of the hydrogen production device; a bypass line that bypasses a portion of the hydrogen flow line and has a downstream-side end portion communicating with the hydrogen flow line on a downstream side of the buffer tank; and a storage tank that is provided in the bypass line and is capable of storing the hydrogen.

In order to achieve the above object, according to the present disclosure, there is provided a method for supplying hydrogen to a hydrogen-consuming unit. The method includes: a hydrogen production step of producing hydrogen; a circulation step of circulating the hydrogen produced in the hydrogen production step toward the hydrogen-consuming unit; a retention step of retaining the hydrogen circulated toward the hydrogen-consuming unit; and a storage step of storing a portion of the hydrogen circulated toward the hydrogen-consuming unit together with the retention step or after the retention step.

Advantageous Effects of Invention

According to the hydrogen supply system of the present disclosure, when a fluctuation in demand for hydrogen is small, the fluctuation in the demand can be absorbed by a fluctuation in the amount of hydrogen in the buffer tank. When the fluctuation in the demand for hydrogen is large, the amount of hydrogen stored in the storage tank is fluctuated, or hydrogen is supplied from the storage tank. Therefore, it is possible to improve followability to the fluctuation in the demand for hydrogen. In addition, according to the method of supplying hydrogen to a hydrogen-consuming unit of the present disclosure, a fluctuation in demand for hydrogen in the hydrogen-consuming unit can be absorbed by the retention step of retaining the hydrogen circulated toward the hydrogen-consuming unit and the storage step of storing a portion of the hydrogen circulated toward the hydrogen-consuming unit together with the retention step or after the retention step. Therefore, it is possible to improve followability to the fluctuation in the demand for hydrogen.

DESCRIPTION OF EMBODIMENTS

Hereinafter, a hydrogen supply system, a hydrogen-consuming plant, and a method for supplying hydrogen to a hydrogen-consuming unit according to embodiments of the present disclosure will be described with reference to the drawings. The embodiments which will be described below show aspects of the present disclosure, do not limit the disclosure, and can be arbitrarily changed within the scope of the technical idea of the present disclosure.

Embodiment 1

<Configuration of Hydrogen Supply System and Hydrogen-Consuming Plant>

Figure 1:
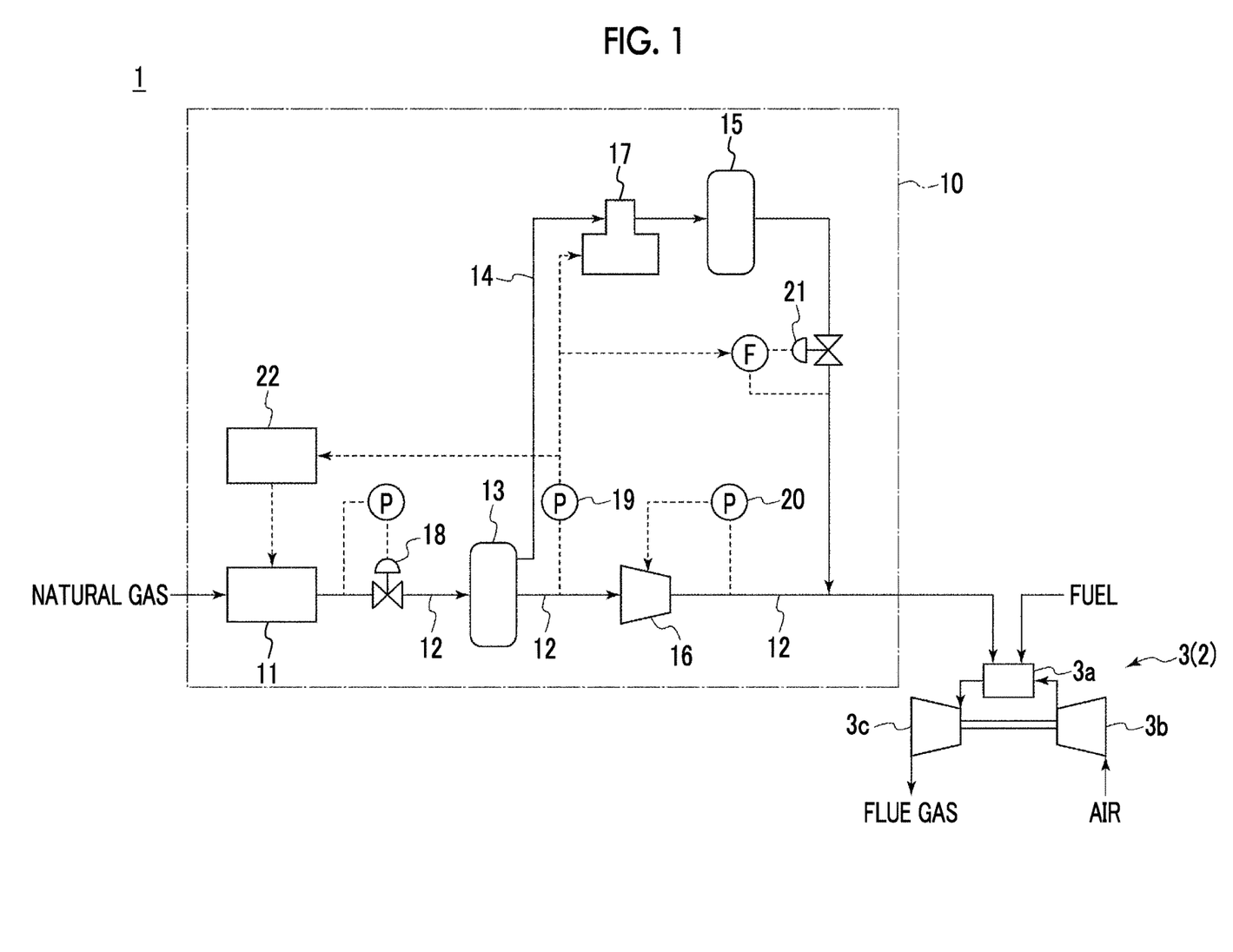
FIG. 1 is a schematic diagram illustrating a configuration of a hydrogen supply system and a hydrogen-consuming plant according to Embodiment 1 of the present disclosure.

As illustrated in FIG. 1, a hydrogen-consuming plant 1 according to Embodiment 1 of the present disclosure includes a hydrogen-consuming unit 2 that consumes hydrogen for an arbitrary purpose and a hydrogen supply system 10 that supplies hydrogen to the hydrogen-consuming unit 2. The hydrogen-consuming unit 2 is not particularly limited, but can be, for example, a gas turbine 3 that uses only hydrogen as a fuel or that uses a fuel obtained by mixing hydrogen with another fuel. In Embodiment 1, the hydrogen-consuming unit 2 will be described as the gas turbine 3 that uses the fuel obtained by mixing hydrogen with another fuel. In a case where the hydrogen-consuming unit 2 is the gas turbine 3, a fuel (for example, natural gas) and hydrogen from the hydrogen supply system 10 are supplied to a combustor 3a of the gas turbine 3. The fuel and the hydrogen are illustrated to be separately supplied to the combustor 3a in FIG. 1. However, the fuel and the hydrogen may be mixed and then supplied to the combustor 3a.

The hydrogen supply system 10 includes a hydrogen production device 11 that produces hydrogen, a hydrogen flow line 12 through which the hydrogen production device 11 communicates with the combustor 3a of the gas turbine 3, a buffer tank 13 that is provided in the hydrogen flow line 12 on a downstream side of the hydrogen production device 11, a bypass line 14 through which the buffer tank 13 communicates with the hydrogen flow line 12 on the downstream side of the buffer tank 13, and a storage tank 15 that is provided in the bypass line 14.

In the hydrogen flow line 12, a compressor 16 is provided between the buffer tank 13 and a portion in which the bypass line 14 is connected to the hydrogen flow line 12. Further, in the hydrogen flow line 12, a pressure control valve 18 is provided between the hydrogen production device 11 and the buffer tank 13, and pressure sensors 19 and 20 are provided between the buffer tank 13 and the compressor 16 and on the downstream side of the compressor 16, respectively. In the bypass line 14, a compressor 17 is provided between the buffer tank 13 and the storage tank 15. In addition, in the bypass line 14, a flow rate control valve 21 is provided on the downstream side of the storage tank 15.

Furthermore, the present disclosure is not limited to the form in which an upstream-side end portion of the bypass line 14 communicates with the buffer tank 13. However, the upstream-side end portion of the bypass line 14 may communicate with the hydrogen flow line 12 on the upstream side or downstream side of the buffer tank 13. In either case, a downstream-side end portion of the bypass line 14 communicates with the hydrogen flow line 12 on the downstream side of the buffer tank 13. In addition, in a case where the compressor 16 is provided on the downstream side of the buffer tank 13, the downstream-side end portion of the bypass line 14 communicates with the hydrogen flow line 12 on the downstream side of the compressor 16.

The hydrogen supply system 10 is provided with a control device 22 for controlling, for example, the load or reaction temperature of the hydrogen production device 11, and the pressure sensor 19 is electrically connected to the control device 22. Further, the flow rate control valve 21 is electrically connected to the pressure sensor 19. The control device 22 includes a central processing unit (CPU), a random access memory (RAM), a read only memory (ROM), an external storage medium (for example, a hard disk drive (HDD) or a solid state drive (SSD)), an interface (IF), a control circuit, and the like which are not illustrated and is implemented by execution of a predetermined control program stored in the ROM by the CPU. The pressure sensor 19 is electrically connected to each of the compressor 17 and the flow rate control valve 21. The pressure sensor 20 is electrically connected to the compressor 16.

The configuration of the hydrogen production device 11 is not particularly limited, and a device that produces hydrogen on any principle can be used. For example, the hydrogen production device 11 may be a device in which hydrogen is produced by a chemical reaction with a raw material. Specific examples of the chemical reaction include a reforming reaction of natural gas or other hydrocarbons, a partial oxidation method, a coal gasification reaction, and an ammonia decomposition reaction. In Embodiment 1, the hydrogen production device 11 will be described as a device that produces hydrogen by a reforming reaction of natural gas as the raw material.

In Embodiment 1, the storage tank 15 having a higher design pressure than the buffer tank 13 is provided such that hydrogen can be compressed to high pressure and then stored in the storage tank 15. Therefore, it is possible to store a large amount of hydrogen in a small volume as compared to the buffer tank 13 and thus to reduce the size of each tank and the installation area of a facility. As a result, it is possible to keep down the overall facility cost required for storage.

<Operation of Hydrogen Supply System and Hydrogen-Consuming Plant>

Next, the operation of the hydrogen supply system 10 and the hydrogen-consuming plant 1 according to Embodiment 1 of the present disclosure will be described. In the hydrogen-consuming plant 1, hydrogen is supplied from the hydrogen supply system 10 to the combustor 3a of the gas turbine 3 through the hydrogen flow line 12. The hydrogen supplied to the combustor 3a is combusted by compressed air supplied from the compressor 3b together with the fuel supplied to the combustor 3a. That is, the hydrogen is consumed by the combustor 3a of the gas turbine 3. The gas turbine 3 is driven by driving the turbine 3c with flue gas generated by the combustion in the combustor 3a.

Next, the operation of the hydrogen supply system 10 (a method for supplying hydrogen to a hydrogen-consuming unit) will be described. In the hydrogen production device 11, hydrogen is produced by the reforming reaction of natural gas (hydrogen production step). The control device 22 controls, for example, the load (amount of hydrogen produced) or reaction temperature of the hydrogen production device 11 by an operation which will be described below. The hydrogen discharged from the hydrogen production device 11 is circulated through the hydrogen flow line 12 by the driving of the compressor 16 (circulation step). In this case, capacity control is performed on the compressor 16 such that a discharge amount where the pressure on the downstream side of the compressor 16 is within a predetermined range is obtained. In addition, the flow rate of the hydrogen circulated through the hydrogen flow line 12 is controlled by controlling the degree of opening of the pressure control valve 18 such that the pressure of an outlet of the hydrogen production device 11 is within a predetermined range.

The hydrogen circulated through the hydrogen flow line 12 flows into the buffer tank 13. The buffer tank 13 can retain an amount of hydrogen corresponding to its volume and pressure (retention step). Therefore, in a case where a fluctuation occurs in the flow rate of the hydrogen circulated through the hydrogen flow line 12, the fluctuation is absorbed by a buffer function of the buffer tank 13 as long as the fluctuation is in a certain range, which makes it possible to perform an operation following a fluctuation in demand for hydrogen in the entire system.

While the hydrogen supply system 10 is operating, a detected value by the pressure sensor 19 (which can be identified with the internal pressure of the buffer tank 13) is transmitted to the control device 22. When the amount of hydrogen produced in the hydrogen production device 11 is in excess of the demand for hydrogen in the gas turbine 3, the amount of hydrogen stored in the buffer tank 13 increases, which results in an increase in the detected value by the pressure sensor 19. On the contrary, when the amount of hydrogen produced in the hydrogen production device 11 is smaller than the demand for hydrogen in the gas turbine 3, the amount of hydrogen stored in the buffer tank 13 decreases, which results in a decrease in the detected value by the pressure sensor 19. The control device 22 controls operating conditions of the hydrogen production device 11 such that the detected value by the pressure sensor 19 is in a predetermined pressure range to control the amount of hydrogen produced.

As described above, the gas turbine 3 is driven by the flue gas generated by combusting the mixed gas of the fuel and the hydrogen. However, it is necessary to perform control such that a combustion ratio of the fuel and the hydrogen does not fluctuate significantly in order for the stable operation of the gas turbine 3. Therefore, in a case where the amount of fuel supplied fluctuates due to a fluctuation in the load of the gas turbine 3, the amount of hydrogen supplied needs to follow the fluctuation in the amount of fuel supplied. In a case where a fluctuation in the amount of fuel supplied is relatively small and a fluctuation in the amount of hydrogen supplied which follows the fluctuation is also relatively small, the fluctuation is absorbed by the buffer function of the buffer tank 13, which makes it possible to perform an operation following a fluctuation in demand for hydrogen in the entire system.

However, for example, in a case where the load of the gas turbine 3 is significantly reduced (including complete shutdown) at night, the demand for hydrogen is also significantly reduced as compared to the case of a normal operation. When the hydrogen production device 11 is configured to produce hydrogen by a chemical process, it is difficult to temporarily stop the operation of the hydrogen production device 11 due to the complexity of the process. For this reason, a large imbalance (excessive supply) occurs between the demand for hydrogen and the amount of hydrogen supplied, and there is a possibility that the imbalance will not be absorbed only by the buffer function of the buffer tank 13. In this case, in Embodiment 1, this imbalance can be absorbed by an operation which will be described below.

In a case where the demand for hydrogen in the gas turbine 3 is significantly reduced, the control device 22 performs control to reduce the amount of hydrogen produced in the hydrogen production device 11 as described above. However, the hydrogen production device 11 has a minimum operating load that is possible in terms of facility, and it is not possible to operate the facility with a load less than the minimum operating load. Therefore, in a case where the demand for hydrogen is reduced to be equal to or less than the minimum operating load of the hydrogen production device 11, the amount of hydrogen supplied is in excess of the demand for hydrogen even though the hydrogen production device 11 is operated with the minimum load. As a result, there is a possibility that the detected value of the pressure sensor 19 will continue to increase.

In a case where the detected value by the pressure sensor 19 continues to increase and reaches a preset pressure even though the hydrogen production device 11 is controlled under the minimum load operating condition, the compressor 17 is started such that the hydrogen is circulated not only through the hydrogen flow line 12 but also through the bypass line 14. The compressor 17 compresses the hydrogen produced in excess of the demand, and the hydrogen is stored in the storage tank 15 (storage step). That is, a portion of the hydrogen circulated toward the gas turbine 3 is stored in the storage tank 15. This makes it possible to absorb the imbalance (excess) of the amount of hydrogen produced from the hydrogen production device 11 with respect to the demand for hydrogen in the gas turbine 3 and to perform the operation following a fluctuation in the demand for hydrogen in the entire system. The compressor 17 is stopped at the discretion of the operator in a case where the pressure of the storage tank 15 reaches a preset maximum pressure or even in a case where the pressure is lower than the preset maximum pressure. Further, in the configuration of the bypass line 14 in Embodiment 1, the storage step is performed together with the retention step (or in a parallel configuration) or after the retention step (or in a serial configuration). In the configuration in which the upstream-side end portion of the bypass line 14 communicates with the hydrogen flow line 12 on the downstream side of the buffer tank 13, the storage step is performed after the retention step (or in a serial configuration).

Then, when the load of the gas turbine 3 increases again, the compressor 17 is stopped, and the degree of opening of the flow rate control valve 21 is adjusted such that the hydrogen stored in the storage tank 15 is gradually discharged and the pressure of the storage tank 15 is reduced to the initial pressure before storage. At this time, the mixing ratio of the hydrogen discharged from the storage tank 15 and the hydrogen produced by the hydrogen production device 11 can be controlled in a range in which the hydrogen production device 11 is not operated under the minimum load condition by setting the degree of opening of the flow rate control valve 21 by a preset control program or the operation of the operator according to the demand for hydrogen and by adjusting the amount of hydrogen discharged from the storage tank 15.

In a case where the demand for hydrogen in the gas turbine 3 increases, discharge amount control is performed on the compressor 16 in order to maintain the detected value of the pressure sensor 20 within a predetermined range. When the discharge amount increases, the detected value of the pressure sensor 19 decreases, and a load increase command is issued to the hydrogen production device 11. However, in a case where the demand for hydrogen increases rapidly, there is a possibility that an increase in the load of the hydrogen production device 11 will not transiently catch up with the increase in the demand for hydrogen. In this case, there is a possibility that the detected value of the pressure sensor 19 will continue to decrease and the operation of the compressor 16 will not be continued. In contrast, when the detected value of the pressure sensor 19 reaches a preset pressure, a flow rate command can be issued to the flow rate control valve 21 to perform the backup supply of hydrogen from the storage tank 15 to the gas turbine 3. That is, the flow rate when hydrogen is circulated from the storage tank 15 to the gas turbine 3 is controlled on the basis of the detected value of the pressure sensor 19. When the backup supply of hydrogen is performed, the discharge amount of the compressor 16 is reduced, and the detected value of the pressure sensor 19 is prevented from further decreasing. Then, the load of the hydrogen production device 11 eventually catches up with the increase, and the detected value of the pressure sensor 19 increases. The issue of the flow rate command to the flow rate control valve 21 is stopped when the pressure is recovered.

In addition, this operation is not performed only when the load of the gas turbine 3 is significantly reduced at night, but can also be applied to when the operation of the gas turbine 3 is stopped for a short period of time to perform minor maintenance.

As described above, when a fluctuation in the demand for hydrogen is small, the fluctuation is absorbed by the buffer function of the buffer tank 13. When the fluctuation in the demand for hydrogen is large, excess hydrogen is compressed and stored in the storage tank 15, or hydrogen for the shortage is supplied from the storage tank 15, which makes it possible to improve the followability of the entire system to a fluctuation in demand for hydrogen.

<Modification Example of Hydrogen Supply System>

In FIG. 1, one storage tank 15 is provided. However, two or more storage tanks 15 may be provided. In this case, a plurality of storage tanks 15 may be provided parallel to the bypass line 14, and hydrogen may be stored in the storage tanks 15 at the same time. In a case where hydrogen is supplied from the storage tanks 15, the hydrogen may be supplied from the storage tanks 15 at the same time.

Alternatively, the hydrogen may be supplied from one storage tank 15, and when the storage tank 15 is empty, the hydrogen may be supplied from another storage tank 15. In addition, a switching device that makes the bypass line communicate with each of a plurality of storage tanks may be provided, and hydrogen may be separately stored in each of the storage tanks 15.

Embodiment 2

Next, a hydrogen supply system and a hydrogen-consuming plant according to Embodiment 2 will be described. The hydrogen supply system and the hydrogen-consuming plant according to Embodiment 2 are different from those according to Embodiment 1 in that the configuration of the storage tank 15 is changed. Further, in Embodiment 2, the same components as those in Embodiment 1 are designated by the same reference numerals, and a detailed description thereof will not be repeated.

<Configuration of Hydrogen Supply System and Hydrogen-Consuming Plant>

Figure 2:
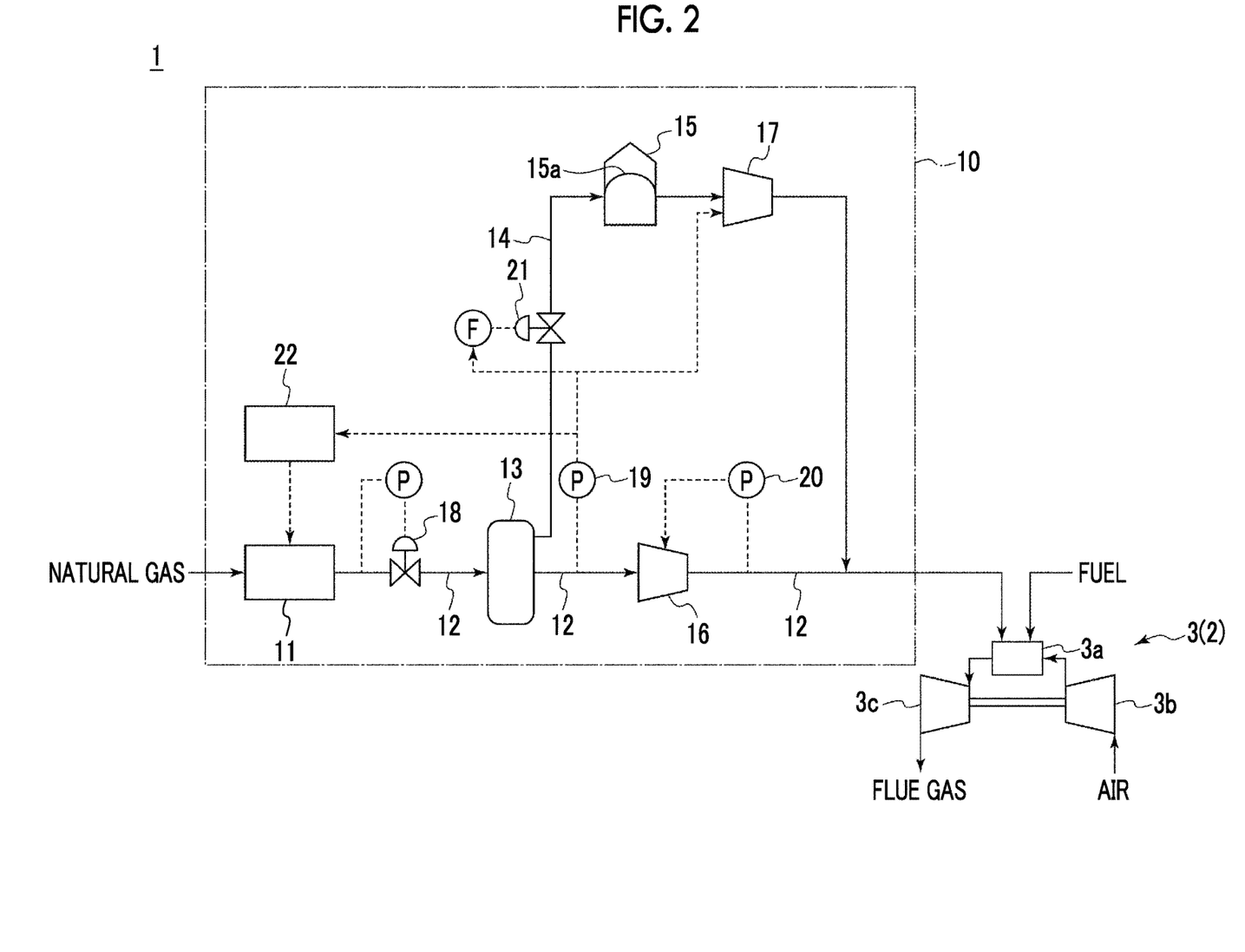
FIG. 2 is a schematic diagram illustrating a configuration of a hydrogen supply system and a hydrogen-consuming plant according to Embodiment 2 of the present disclosure.

As illustrated in FIG. 2, in a hydrogen supply system 10 according to Embodiment 2 of the present disclosure, the storage tank 15, the compressor 17 that is located on the downstream side of the storage tank 15, and the flow rate control valve 21 that is located on the upstream side of the storage tank 15 are provided in the bypass line 14. The storage tank 15 according to Embodiment 2 stores hydrogen under a condition of lower pressure than the buffer tank 13. Since gas is stored under the low-pressure condition, it is possible to increase the size of each tank and to reduce the number of tanks installed. In addition, a tank main body can have an inexpensive structure. As a result, it is possible to keep down the overall facility cost required for storage.

The configuration of the storage tank 15 having a lower storage pressure than the buffer tank 13 is not particularly limited, and any tank can be used. A tank having a configuration in which a movable roof 15a provided in a tank outer shell is moved up and down according to the inflow and outflow of gas to store hydrogen in a state of substantially atmospheric pressure can be used as an example of the storage tank 15. The other configurations are the same as those in Embodiment 1.

<Operation of Hydrogen Supply System and Hydrogen-Consuming Plant>

In the hydrogen supply system 10 according to Embodiment 2 of the present disclosure, an operation that, in a case where a fluctuation in demand for hydrogen is small, follows a load while absorbing the fluctuation using the buffer function of the buffer tank 13 is the same as that in Embodiment 1. In Embodiment 2, the operation in which, in a case where the fluctuation in demand for hydrogen is large, the amount of hydrogen supplied follows a fluctuation in the amount of fuel supplied is different from that in Embodiment 1. Therefore, only this operation will be described below.

As in Embodiment 1, in a case where the demand for hydrogen in the gas turbine 3 is significantly reduced, the hydrogen production device 11 is controlled to reduce the amount of hydrogen produced. In a case where the demand for hydrogen is reduced to be equal to or less than the minimum operating load of the hydrogen production device 11, the amount of hydrogen supplied is in excess of the demand. As a result, there is a possibility that the detected value of the pressure sensor 19 will continue to increase. In this case, when the detected value of the pressure sensor 19 reaches a preset pressure, an open command is issued to the flow rate control valve 21 such that hydrogen is circulated not only through the hydrogen flow line 12 but also through the bypass line 14. The hydrogen circulated through the bypass line 14 is decompressed to substantially atmospheric pressure by the flow rate control valve 21, flows into the storage tank 15, and is stored in the storage tank 15. That is, a portion of the hydrogen circulated toward the gas turbine 3 is stored in the storage tank 15. Therefore, it is possible to absorb the imbalance (excess) of the amount of hydrogen produced from the hydrogen production device 11 with respect to the demand for hydrogen in the gas turbine 3 and to perform an operation following a fluctuation in the demand for hydrogen in the entire system.

After that, when the demand for hydrogen in the gas turbine 3 increases again, the flow rate control valve 21 is closed, and the compressor 17 is started such that the hydrogen stored in the storage tank 5 is gradually discharged and the storage amount of the storage tank 15 is reduced to the initial amount before the start of storage. At this time, the mixing ratio of the hydrogen discharged from the storage tank 15 and the hydrogen produced by the hydrogen production device 11 can be controlled in a range in which the hydrogen production device 11 is not operated under the minimum load condition by setting the operating load of the compressor 17 by a preset control program or the operation of the operator according to the demand for hydrogen and by adjusting the amount of hydrogen discharged from the storage tank 15.

In Embodiment 2, a starting circuit of the compressor 17 is electrically connected to the pressure sensor 19. In a case where the demand for hydrogen in the gas turbine 3 increases, discharge amount control is performed on the compressor 16 in order to maintain the detected value of the pressure sensor 20 within a predetermined range. When the discharge amount increases, the detected value of the pressure sensor 19 decreases, and a load increase command is issued to the hydrogen production device 11. However, in a case where the demand for hydrogen increases rapidly, there is a possibility that an increase in the load of the hydrogen production device 11 will not transiently catch up with the increase in the demand for hydrogen. In this case, there is a possibility that the detected value of the pressure sensor 19 will continue to decrease and the operation of the compressor 16 will not be continued. In contrast, when the detected value of the pressure sensor 19 reaches a preset pressure, an operation command can be issued to the compressor 17 to perform the backup supply of hydrogen from the storage tank 15 to the gas turbine 3. When the backup supply of hydrogen is performed, the discharge amount of the compressor 16 is reduced, and the detected value of the pressure sensor 19 is prevented from further decreasing. Then, the load of the hydrogen production device 11 eventually catches up with the increase, and the detected value of the pressure sensor 19 increases. When the pressure is recovered, the operation command to the compressor 16 is stopped.

As described above, in Embodiment 2, when a fluctuation in the demand for hydrogen is small, the fluctuation is absorbed by the buffer function of the buffer tank 13. When the fluctuation in the demand for hydrogen is large, excess hydrogen is stored in the storage tank 15, or hydrogen for the shortage is supplied from the storage tank 15, which makes it possible to improve the followability of the entire system to the fluctuation in the demand for hydrogen.

<Modification Example of Hydrogen Supply System>

In Embodiment 2, one storage tank 15 is provided as illustrated in FIG. 2. However, as in the modification example of Embodiment 1, two or more storage tanks 15 may be provided. In Embodiment 2, an operation method that stores hydrogen in each storage tank 15 and supplies hydrogen from each storage tank 15 in a case where a plurality of storage tanks 15 are provided is the same as that in the modification example of Embodiment 1.

Other Modification Examples

In Embodiments 1 and 2, the design pressure of the buffer tank 13 is different from the design pressure of the storage tank 15. However, the buffer tank 13 and the storage tank 15 may have the same design pressure. Even in this aspect, when a fluctuation in the demand for hydrogen is small, the fluctuation is absorbed by the buffer function of the buffer tank 13. When the fluctuation in the demand for hydrogen is large, excess hydrogen is compressed and stored in the storage tank 15, or hydrogen for the shortage is supplied from the storage tank 15, which makes it possible to obtain the same operation and effect as those in Embodiments 1 and 2.

For example, the content described in each of the above-described embodiments is understood as follows.

[1] According to an aspect, there is provided a hydrogen supply system including: a hydrogen production device (11); a hydrogen flow line (12) through which hydrogen produced by the hydrogen production device (11) is circulated; a buffer tank (13) that is provided in the hydrogen flow line (12) on a downstream side of the hydrogen production device (11); a bypass line (14) that bypasses a portion of the hydrogen flow line (12) and has a downstream-side end portion communicating with the hydrogen flow line (12) on a downstream side of the buffer tank (13); and a storage tank (15) that is provided in the bypass line (14) and is capable of storing the hydrogen.

According to the hydrogen supply system of the present disclosure, when a fluctuation in demand for hydrogen is small, the fluctuation in the demand can be absorbed by a fluctuation in the amount of hydrogen in the buffer tank. When the fluctuation in the demand for hydrogen is large, the amount of hydrogen stored in the storage tank is fluctuated or hydrogen is supplied from the storage tank. Therefore, it is possible to improve followability to the fluctuation in the demand for hydrogen.

[2] According to another aspect, in the hydrogen supply system according to [1], an internal pressure of the storage tank (15) is higher than an internal pressure of the buffer tank (13).

According to this configuration, it is possible to store a large amount of hydrogen in a small volume and thus to reduce the size of each tank and the installation area of a facility. As a result, it is possible to keep down the overall facility cost required for storage.

[3] According to still another aspect, in the hydrogen supply system according to [1], an internal pressure of the storage tank (15) is lower than an internal pressure of the buffer tank (13).

According to this configuration, since gas is stored under a low-pressure condition, it is possible to increase the size of each tank and to reduce the number of tanks installed. In addition, a tank main body can have an inexpensive structure. As a result, it is possible to keep down the overall facility cost required for storage.

[4] According to yet another aspect, in the hydrogen supply system according to any one of [1] to [3], in the hydrogen production device (11), the hydrogen is produced by a chemical reaction of a raw material.

In a case where hydrogen is produced by the chemical reaction, it is difficult to make the amount of hydrogen produced in the hydrogen production device follow a large fluctuation in demand for hydrogen. However, according to this configuration, it is possible to make the amount of hydrogen supplied from the hydrogen supply system closely follow the fluctuation in the demand for hydrogen.

[5] According to still yet another aspect, in the hydrogen supply system according to [4], the raw material is natural gas or hydrocarbon.

In a case where hydrogen is produced by a reforming reaction of natural gas or hydrocarbon, it is difficult to make the amount of hydrogen produced follow a large fluctuation in the demand for hydrogen. However, according to this configuration, the amount of hydrogen supplied from the hydrogen supply system can closely follow the fluctuation in the demand for hydrogen.

[6] According to an aspect, there is provided a hydrogen-consuming plant including: the hydrogen supply system (10) according to any one of [1] to [5]; and a hydrogen-consuming unit (2) that consumes the hydrogen supplied from the hydrogen supply system (10) through the hydrogen flow line (12).

According to the hydrogen-consuming plant of the present disclosure, it is possible to improve the followability of the amount of hydrogen supplied according to a fluctuation in the load of the hydrogen-consuming unit.

[7] According to another aspect, in the hydrogen-consuming plant according to [6], the hydrogen-consuming unit (2) is a gas turbine (3).

According to this configuration, it is possible to improve the followability of the amount of hydrogen supplied according to a fluctuation in the load of the gas turbine.

[8] According to an aspect, there is provided a method for supplying hydrogen to a hydrogen-consuming unit. The method includes: a hydrogen production step of producing hydrogen; a circulation step of circulating the hydrogen produced in the hydrogen production step toward the hydrogen-consuming unit (2); a retention step of retaining the hydrogen circulated toward the hydrogen-consuming unit (2); and a storage step of storing a portion of the hydrogen circulated toward the hydrogen-consuming unit (2) together with the retention step or after the retention step.

According to the method for supplying hydrogen to a hydrogen-consuming unit of the present disclosure, a fluctuation in demand for hydrogen in the hydrogen-consuming unit can be absorbed by the retention step of retaining the hydrogen circulated toward the hydrogen-consuming unit and the storage step of storing a portion of the hydrogen circulated toward the hydrogen-consuming unit together with the retention step or after the retention step. Therefore, it is possible to improve followability to the fluctuation in demand for hydrogen.

[9] According to another aspect, in the method according to [8], a pressure of the hydrogen retained in the retention step is detected, and the storage step is performed on the basis of a detected value of the pressure.

According to this method, it is possible to improve followability to a reduction in the demand for hydrogen in the hydrogen-consuming unit.

[10] According to still another aspect, in the method according to [8] or [9], a portion of the hydrogen circulated toward the hydrogen-consuming unit (2) is stored in a compressed state.

According to this method, it is possible to store a large amount of hydrogen in a small volume. Therefore, it is possible to reduce the size of each tank and the installation area of a facility.

[11] According to yet another aspect, in the method according to any one of [8] to [10], in a case where the demand for hydrogen in the hydrogen-consuming unit (2) increases during the retention step and the storage step, the storage step is stopped, and the hydrogen stored in the storage step is supplied to the hydrogen-consuming unit (2).

According to this method, in a case where the demand for hydrogen increases after coping with a reduction in the demand for hydrogen in the hydrogen-consuming unit, it is possible to improve followability to the increase in the demand for hydrogen.

[12] According to still yet another aspect, in the method according to [11], in a case where the hydrogen stored in the storage step is supplied to the hydrogen-consuming unit (2), a flow rate when the hydrogen stored in the storage step is circulated toward the hydrogen-consuming unit (2) is controlled on the basis of the detected value of the pressure of the retained hydrogen.

According to this method, in a case where the demand for hydrogen increases after coping with a reduction in the demand for hydrogen in the hydrogen-consuming unit, it is possible to improve followability to the increase in the demand for hydrogen.

[13] According to yet still another aspect, in the method according to or [12], in a case where a detected value of a pressure of the hydrogen retained in the retention step decreases, the amount of the hydrogen, which has been stored in the storage step, supplied to the hydrogen-consuming unit (2) is increased.

In a case where an increase in the amount of hydrogen produced in the hydrogen production step does not transiently catch up with a rapid increase in the demand for hydrogen, the detected value of the pressure of the hydrogen retained in the retention step decreases. In contrast, according to this method, the amount of hydrogen, which has been retained in the retention step, supplied to the hydrogen-consuming unit is reduced by the backup supply of the hydrogen stored in the storage step to the hydrogen-consuming unit. Therefore, the increase in the amount of hydrogen produced in the hydrogen production step catches up with the rapid increase.

REFERENCE SIGNS LIST

1 Hydrogen-consuming plant
2 Hydrogen-consuming unit
3 Gas turbine
10 Hydrogen supply system
11 Hydrogen production device
12 Hydrogen flow line
13 Buffer tank
14 Bypass line
15 Storage tank

The invention claimed is:

1. A hydrogen supply system comprising:
a hydrogen production device;
a hydrogen flow line through which hydrogen produced by the hydrogen production device is circulated;
a buffer tank that is provided in the hydrogen flow line on a downstream side of the hydrogen production device;
a compressor that is provided in the hydrogen flow line on a downstream side of the buffer tank;
a bypass line that bypasses a portion of the hydrogen flow line and has a downstream-side end portion communicating with the hydrogen flow line on a downstream side of the buffer tank; and
a storage tank that is provided in the bypass line and is capable of storing the hydrogen,
wherein an internal pressure of the storage tank is lower than an internal pressure of the buffer tank.

2. The hydrogen supply system according to claim 1,
wherein, in the hydrogen production device, the hydrogen is produced by a chemical reaction of a raw material.

3. The hydrogen supply system according to claim 2,
wherein the raw material is natural gas or hydrocarbon.

4. A hydrogen-consuming plant comprising:
the hydrogen supply system according to claim 1; and
a hydrogen-consuming unit that consumes the hydrogen supplied from the hydrogen supply system through the hydrogen flow line.

5. The hydrogen-consuming plant according to claim 4,
wherein the hydrogen-consuming unit is a gas turbine.

6. A method for supplying hydrogen to a hydrogen-consuming unit, the method comprising:
a hydrogen production step of producing hydrogen;
a circulation step of circulating the hydrogen produced in the hydrogen production step toward the hydrogen-consuming unit;
a retention step of retaining the hydrogen circulated toward the hydrogen-consuming unit; and a storage step of storing a portion of the hydrogen circulated toward the hydrogen-consuming unit together with the retention step or after the retention step, wherein a pressure of hydrogen stored in the storage step is lower than a pressure of hydrogen retained in the retention step.

7. The method for supplying hydrogen to a hydrogen-consuming unit according to claim 6, wherein a portion of the hydrogen circulated toward the hydrogen-consuming unit is stored in a compressed state.

8. The method for supplying hydrogen to a hydrogen-consuming unit according to claim 6, wherein, in a case where a demand for hydrogen in the hydrogen-consuming unit increases during the retention step and the storage step, the storage step is stopped, and the hydrogen stored in the storage step is supplied to the hydrogen-consuming unit.

9. The method for supplying hydrogen to a hydrogen-consuming unit according to claim 6, wherein, in a case where the hydrogen stored in the storage step is supplied to the hydrogen-consuming unit, a flow rate when the hydrogen stored in the storage step is circulated toward the hydrogen-consuming unit is controlled based on a detected value of a pressure of the retained hydrogen.

10. The method for supplying hydrogen to a hydrogen-consuming unit according to claim 6, wherein a pressure of the hydrogen retained in the retention step is detected, and an amount of the hydrogen produced in the hydrogen production step is controlled based on a detected value of the pressure.

11. The method for supplying hydrogen to a hydrogen-consuming unit according to claim 10, wherein, after controlling the amount of the hydrogen produced in the hydrogen production step, a pressure of the hydrogen retained in the retention step is detected, and the storage step is performed based on the detected value of the pressure, or the hydrogen stored in the storage step is supplied to the hydrogen-consuming unit.

* * * * *